Feb. 13, 1968   R. A. DI CURCIO   3,369,101
LASER MICRO-PROCESSER

Filed April 30, 1964   3 Sheets-Sheet 1

INVENTOR
ROBERT A. DiCURCIO
BY Roger A. Van Kirk
ATTORNEY

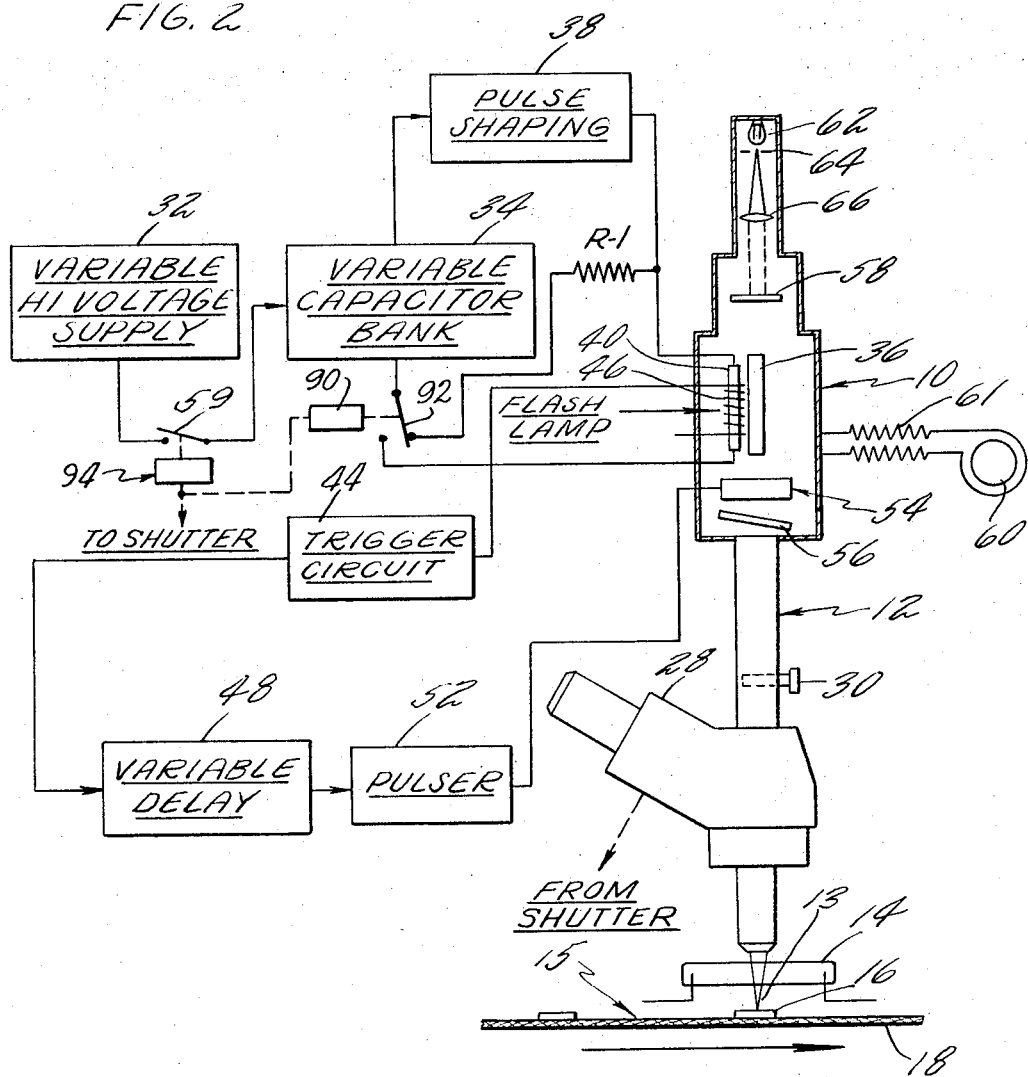

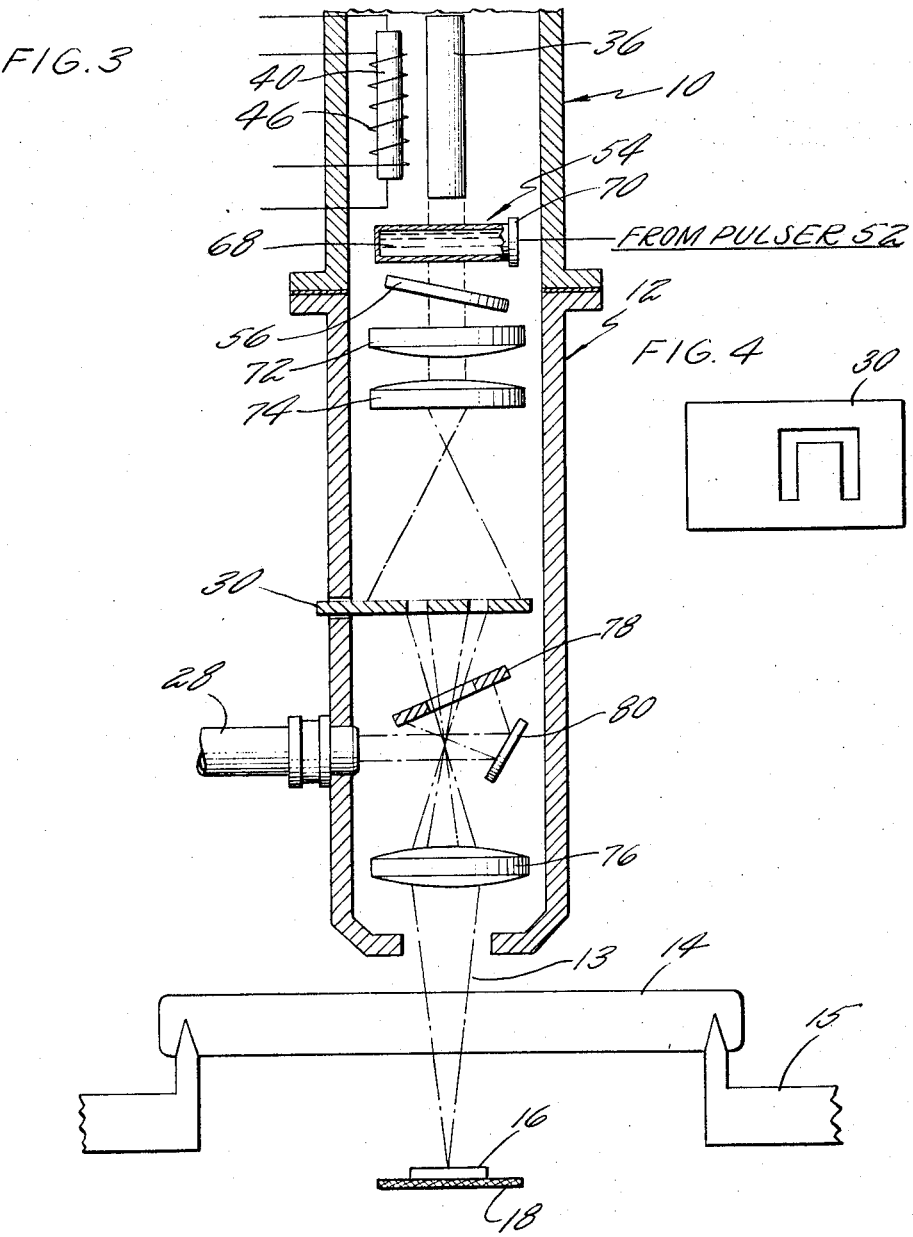

United States Patent Office 3,369,101
Patented Feb. 13, 1968

3,369,101
LASER MICRO-PROCESSER
Robert A. Di Curcio, Windsor, Conn., assignor to United Aircraft Corporation, East Hartford, Conn., a corporation of Delaware
Filed Apr. 30, 1964, Ser. No. 363,700
5 Claims. (Cl. 219—121)

ABSTRACT OF THE DISCLOSURE

Apparatus for working a workpiece with a laser beam comprising a frame mounted movably with respect to the workpiece for varying the point of impingement on the workpiece of the laser beam, means mounted on the frame for generating said laser beam, said generating means comprising an optical cavity containing a laser element and defining an optical path for the feedback of optical energy thereto, pumping means mounted on the frame for causing oscillation of atoms between energy levels in said laser element, a source of focused light mounted on the frame and displaced along said optical path adjacent said optical cavity and aligned to pass light therethrough along said entire feedback path and through said laser element, means for observing the impingement of light from said source upon a workpiece after transmission through said laser element and emanation from said optical cavity, said observing means comprising means for inhibiting and disabling said pumping means and coherent light lasing action during observation of the workpiece.

---

This invention relates to a microheat source. More particularly, this invention is directed to an apparatus which utilizes an energized beam to provide heat necessary for the performance of or assistance in working or otherwise producing changes in materials in localized regions.

While not limited thereto, this invention contemplates using the output of an optical maser as a precisely controllable microheat source. Such a microheat source, consisting of a precisely focused beam of photons, may be used to perform such processes as selective diffusion, surface passivation, and selective gas plating of semiconductor devices. The intense heat generated at the focal point of a laser beam may also be used to selectively remove material, through localized evaporation, and thus to etch or scribe thin film devices or to dice semiconductor devices.

Each of the above-mentioned processes are useful in semiconductor and thin film technology. In these technologies, there is need for precisely controllable, intense heat sources adaptable to the extremely fine work to be performed. Also, particularly in the area of solid state or integrated circuitry, there is an ever present problem caused by the surface absorption of impurities by the semiconductor devices. For example, in the fabrication of a solid state circuit, each device requires several diffusion steps wherein desired impurities are diffused through oxide masks to produce active and passive circuit elements. These steps, which go into the fabrication of a typical solid state circuit, are described in copending application Ser. No. 186,467, filed Apr. 10, 1962, by Lee R. Ullery, Jr., et al., and assigned to the same assignee as this invention. As should be obvious, in the many steps involved in producing a finished active semiconductive device, the semiconductor surface is repeatedly exposed to potential sources of contamination. It is an object of this invention to provide for accomplishment of the various diffusion steps entirely within the confines of an ultra high vacuum chamber to thus avoid the aforementioned possibilities of contamination.

It is also an object of this invention to provide a novel microheat source.

It is another object of this invention to predetermine the focus point of the energized beam generated by a laser micro processing tool.

It is yet another object of this invention to provide a microheat source which is adjustable about three axes.

It is still another object of this invention to precisely control the area of a workpiece to be heated by a microheat source.

It is also an object of this invention to provide a remotely located microheat source which may be used to control chemical operations in a controlled atmosphere.

These and other objects of this invention are accomplished by an optical maser which may be located outside of a work chamber with its beam focused on a workpiece located inside said chamber in the desired atmosphere. The optical maser is movable about three axes outside of a transparent port in the wall of the chamber and will be fired through a mask to give the energized beam the desired size and shape. The point of focus and the area to be heated by the maser output may be determined, prior to energizing the optical maser, by a novel focusing scheme whereby a light source is projected through the active laser element onto the workpiece.

This invention may be better understood and its numerous advantages will become apparent to those skilled in the art by reference to the accompanying drawings wherein like reference numerous refer to like elements in the various figures and in which:

FIGURE 2 is a partially cut away side view of the apparatus of FIGURE 1 showing the control circuitry for the optical maser and the novel focusing means of this invention.

FIGURE 3 is a partial cut away view of the apparatus of FIGURE 1 which illustrates the optical viewing system and the gating means which controls the output of the optical maser.

FIGURE 4 is a top view of a mask which may be inserted into apparatus of FIGURE 1 to produce a heat effected zone on the workpiece of the desired shape.

Figure 1:
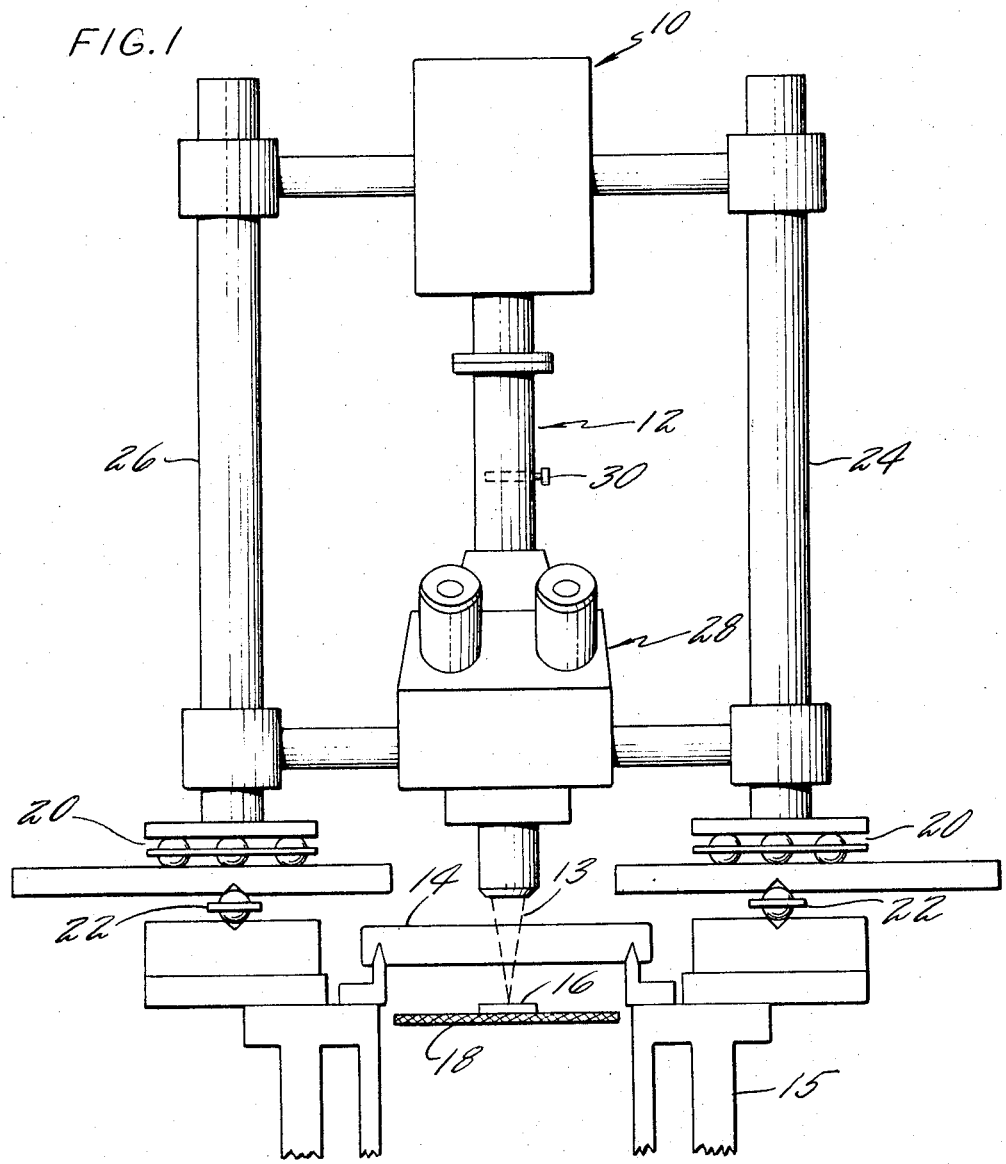
FIGURE 1 is an over-all view of the microheat source of this invention positioned outside of a transparent port in a work chamber.

Referring now to FIGURE 1, the optical maser or laser which provides the energized beam of this invention is located in an optical cavity or laser head 10. The output of the laser will be an intense beam of photons. This beam will be focused in an optical column 12 and will emerge therefrom as a converging beam 13. This beam will pass through a transparent quartz or sapphire port 14 mounted in the side of the gas processing or work chamber 15. The beam focal point will be within the chamber at the surface of a workpiece 16 carried on a movable belt 18. Since the beam is not focused at its point of entry into the work chamber, its intensity will be insufficient to damage port 14. The laser and its focusing means are supported on the process or work chamber 15 by supporting columns 24 and 26 which are movable in the $x$ direction by means of bearings 20 and in the $y$ direction by means of bearings 22. The entire laser system comprising laser head 10 and optical column 12 is movable in the $z$ direction or vertically by sliding up or down supporting columns 24 and 26. By adjusting the vertical position of the laser head and optical column, which provide a beam having a fixed focal length relative to port 14, the size of the area to be worked can be varied. By moving the apparatus about the $x$ and $y$ axes, the beam impingement point may be adjusted. The size and shape of the area of the workpiece illuminated by the beam may be observed, prior to energizing the laser by means of an optical system 28 which will be described in more detail below. Insertable in column 12 at a point where the beam is defocused is a mask 30 which will control the shape of the light spot produced on workpiece 16.

Referring now to FIGURE 2, a side view of the apparatus of FIGURE 1, less the means for mechanically positioning the laser head and focusing column, is shown. The laser system will consist of a laser head or optical cavity 10 and associated electronics, including a variable high voltage supply 32 and capacitor bank 34 which supply pumping energy to the laser element. In FIGURE 2, the laser element is shown as a laser rod 36. In the case where the apparatus of this invention will be used to control localized diffusion of impurities into silicon chips, the laser rod will be chosen such that its characteristic emission does not coincide with a spectral region in which silicon is highly transparent. Rods which emit in the vicinity of one micron or below are satisfactory since silicon becomes transparent at wave lengths above 1.1 microns. A ruby rod, having characteristic emission wave length at .69 micron, or neodymium-doped glass, at 1.06 microns, are satisfactory. If the apparatus of this invention is to be utilized to perform a variety of different tasks, a plurality of laser elements, arranged in accordance with a roto-laser concept, may be selectively positioned into the location of rod 36 of FIGURE 2. The roto-laser concept may also be utilized to achieve high pulse repetition rates. For a complete description of a roto-laser, reference may be had to my copending application Ser. No. 284,560, filed May 31, 1963, and entitled, "Laser System."

To be used for the disclosed purpose, the power supply for this invention should be capable of delivering up to 1000 joules in pumping energy to the laser rod. Variable high voltage supply 32 preferably will deliver a D.C. output voltage variable from 0 to 5 kv. and capacitor bank 34 will provide at least 100 microfarads capacity. Capacitor bank 34 is connected, via a pulse shaping circiuit 38, across a pumping lamp 40. The flash lamp 40 and its igniting circuitry are conventional pumping apparatus and form no part of the present invention. In order to ionize the gas in flash-lamp 40, a trigger circuit 44, which supplies a high voltage pulse to a coil 46 wound around lamp 40, is provided. The voltage pulse supplied to coil 46 ionizes the gas in the flash lamp thereby permitting the capacitor bank 34 to discharge therethrough producing an intense burst of pumping light. Pulse shaping circuit 38, which in the usual case comprises merely an inductor, serves to smooth the output pulse from the capacitor bank.

At the same time trigger circuit 44 causes ionizing of the gas in flash-lamp 40, it also supplies a control signal to a variable delay line 48. The delayed trigger pulse from delay line 48 is applied as the activating signal to a pulser 50. As will be explained in more detail below, the output of pulser 50 serves to gate the laser by controlling a gating means 54 positioned between laser rod 36 and a first external mirror 56. As is well known in the art, external mirror 56 will be less than 100% reflective so that the laser may fire through this mirror and the photon beam will thus impinge upon workpiece 16. Arranged adjacent to and in a plane perpendicular to the axis of laser rod 36 is a second external mirror 58. Mirror 58 will be a one-way mirror of the type well known in the art. That is, mirror 58 will be totally reflective of emission emanating from laser rod 36 but, for the reasons to be detailed below, will pass light impinging on its other surface.

In order to protect the eyes of the operator, means must be provided to prevent the laser from firing during periods of observation of the work through optical viewing system 28. The preferable method of accomplishing this protection is to provide a mechanical shutter, not shown, in the optical viewing system. This shutter will be mechanically coupled to an interlock switch 59 which is connected between high voltage supply 32 and capacitor bank 34. Ganged with switch 59, through a dash pot 90, will be a second switch 92. Switch 92 is a double pole, single throw switch which, upon opening of the shutter, places a resistor R1 across the capacitor bank thus providing a path for discharge of any remaining charge stored therein. The foregoing is necessary to insure that the laser will not be inadvertently fired by previously stored energy the instant after opening the shutter. Dash pot 90 imparts a short mechanical delay so that resistor R1 will not be connected across the high voltage supply due to throwing switch 92 prior to opening switch 59. To insure that, upon closing of the shutter, switch 59 does not close before switch 92 is thrown, a second dash pot 94, which operates in the opposite direction from dash pot 90, is provided. Closing of the mechanical shutter will cause closing of switches 59 and 92 thereby enabling the pumping of the laser. With the mechanical shutter open so that work can be viewed, it is impossible to fire the laser because the capacitor bank is disconnected from the flash lamp and it is also discharged through resistor R1.

As should be obvious to those skilled in the art, means must also be provided to cool the laser rod. For this purpose, there is provided a blower motor 60 which delivers a stream of cooling gas through conduit 61 to the optical cavity. This stream of cooling gas will be directed, by means not shown, over rod 36 and flash-lamp 40 to cool these elements between pulses.

To be practical and have wide utility as a tool, means should be provided to predetermine where the output of the laser will impinge and the size and shape of the focused laser beam. In accordance with one of the novel features of this invention, there is provided a focusing lamp 62 which provides a beam of light which is collimated by a mask 64. This beam of light is further collimated by means of lens 66 and directed coaxially through laser rod 36. As mentioned above, mirror 58 is a one-way mirror and thus does not interfere with the beam of light from lamp 62. The beam of light from lamp 62 will pass the length of rod 36, through gating means 54 and, with some attenuation, through mirror 56. The light beam will then be focused in column 12 by the same means which focuses the laser beam on the workpiece. Thus, by viewing the workpiece through optical system 28, the operator will be able to observe a spot of light which has travelled through laser rod 36 and been focused on the workpiece by the same means which focuses the laser output. The operator will thus be able to observe an illuminated area on workpiece 16 which will correspond to the area that will be heated by the intense light beam produced by the laser when it is fired. Since mask 30 is inserted in column 12, as shown in FIGURE 1, up the column from the optical system 28, the light spot projected on the workpiece will have the same shape as the laser output. By moving the laser and optical column in the manner described above, the size and location of the light spot on the workpiece may be precisely controlled.

Referring now to FIGURE 3, the means for gating the laser and the means, contained in column 12, for focusing the laser output are shown in detail. Gating means 54 may take several forms. For example, a system of rotating mirrors may be used. To be used for the intended purpose, the rotating mirror or mirrors would be coated with a partially reflective coating commensurate with the wave length of the laser employed. Interposition of such a mirror would permit the focused beam to pass with intensity sufficient to function as intended. However, as shown in FIGURE 3, the gating means comprises an ultrasonic cell 68 activated by a transducer 70 which is connected to the output of pulser 52. The operation of such an ultrasonic gating means is described in detail in copending application Ser. No. 228,969, filed Oct. 8, 1962 by Anthony J. DeMaria and assigned to the same assignee as this invention. Briefly, the ultrasonic shutter operates to prevent oscillation or optical maser action until a large overpopulation of the upper energy level of the laser rod results. During pumping, that is when the flash lamp is fired, oscillation of atoms between upper and lower energy levels occurs in the laser element. During this oscillation period of the optical maser, induced emission decreases the lifetime of the upper of the two maser levels thereby limiting the possible population inversion for a given pumping power. This limitation of the inversion population in turn limits the output peak power of the device. Since the R1 fluorescence line has a spontaneous decay time of a few milliseconds, energy may be stored in this level for approximately the duration of the pumping flash if means are available to withhold lasing action. Thus, by constructing an optical laser with detached reflectors and then inserting a closed shutter in the optical feedback path, the device will not oscillate and a large overpopulation of the upper level will result. If the shutter is opened when the overpopulation is at a maximum, optical maser action will be initiated and an extremely large output will be generated.

It has been found that the insertion of an ultrasonic cell between an external reflector and the laser rod will lead to a shutter action. However, it is necessary that the external reflector, in this case less than 100% reflective mirror 56, be positioned so that it is not parallel to the other external reflector, mirror 42. The deviation from parallelism must be sufficient to prevent lasing action with a given amount of optical pumping. When the overpopulation of the upper level is a maximum, the transducer 70 is pulsed with a short pulse. When a light beam is passed through an ultrasonic field, defraction, refraction, and focusing occur depending upon the relation between the width of the light beam and the wave length of the sound wave. These phenomena arise from the alternating compressions and refractions altering the density of the medium through which the ultrasonic waves pass. The optical index of refraction depends on the density of the medium through which the light is passing. For the case where the width of the light beam $w$ is much narrower than the sound wave $\rho^*$, refraction prevails and the light beam is refracted back and forth in a sinusoidal manner. The deflection angle $\theta$ is given by the expression $$\sin \theta = \frac{2\pi \Delta \mu L}{\lambda^*} \cos 2\pi f^* t$$

where $\Delta \mu$ is the maximum change of the refractive index caused by the ultrasound, $L$ the path length of the light within the sound field, and $f^*$ the ultrasonic frequency. Thus, by pulsing the transducer 70 on ultrasonic cell 68 when overpopulation of the upper level of the optical maser is a maximum, a condition will occur wherein the radiation is directed perpendicular to the external reflector. At this time, a high restoration of positive feedback to the laser is initiated and oscillation will result in a large burst of radiation which will pass through mirror 56. The intensity or magnitude of the pulse of radiation, and thus the energy in the beam impinging on the work after focusing in column 12, may be controlled within limits by controlling the delay imparted by delay line 48.

The output from the laser, as well as the light from lamp 62, is defocused by a condensing lens system consisting of lenses 72 and 74 so that the optical mask 30 is illuminated with a uniformly defocused laser or light beam. Obviously, it is necessary that a defocused beam be projected on mask 30 so as not to destroy the mask. The light passed by mask 30 is focused by projection lens 76 on the workpiece. As explained above in relation to FIGURE 1, the size of the mask pattern projected on the workpiece may be controlled by raising or lowering the column 12.

Between mask 30 and projection lens 76 there is located a pair of mirrors 78 and 80 which cooperate to serve the function of a penta-prism. That is, during the focusing operation, the image of the illuminated area on the workpiece will be projected on mirror 78 and reflected by mirrors 78 and 80 to optical system 28. As is shown in FIGURE 3, mirror 78 is apertured to permit unattenuated passage of the light beam 13 down column 12.

As hereinabove described, this invention comprises an extremely useful and flexible tool for the performance of work of various natures. In the area of integrated circuitry, use of this invention to control diffusion processes virtually eliminates possibility of contamination since the work chamber can be evacuated and thereafter the requisite amounts of the desired impurities in gaseous form can be released into the chamber. It must also be noted that, for tasks such as scribing thin film devices or producing microwelds, the operation of the disclosed device may be automated. The foregoing may be accomplished by use of a feedback servo-system to control gating and movement of the laser head and focusing column. The servo-system may in turn be controlled in response to a stored program or, to achieve more flexibility, by an adaptive positioner of the type disclosed in copending application Ser. No. 274,177, filed Apr. 19, 1963 by L. R. Ullery, Jr., and assigned to the same assignee as this invention.

While a preferred embodiment of this invention has been shown and described, various modifications and substitutions may be made without deviating from the spirit and scope of this invention. Thus, this invention is described by way of illustration rather than limitation and accordingly it is understood that this invention is to be limited only by the appended claims taken in view of the prior art.

I claim:
1. Apparatus for working a workpiece with an energized beam of photons comprising:
   a frame mounted movably with respect to the workpiece for varying the point of impingement on the workpiece of the energized beam;
   means mounted on the frame for generating a beam of coherent light by the stimulated emission of optical radiation, said generating means comprising an optical cavity containing a laser element and defining an optical path for the feedback of optical energy thereto;
   pumping means mounted on the frame for causing oscillation of atoms between energy levels in said laser element;
   a source of focused light mounted on the frame and displaced along said optical path adjacent said optical cavity and aligned to pass light therethrough along said entire feedback path and through said laser element;
   means for observing the impingement of light from said source upon a workpiece after transmission through said laser element and emanation from said optical cavity.
2. The apparatus of claim 1 wherein said observing means further comprises:
   means for inhibiting and disabling said pumping means and coherent light lasing action during observation of the workpiece.
3. The apparatus of claim 2 and further comprising:
   means for defocusing the light emanating from the optical cavity;
   means for refocusing the light defocused by said defocusing means; and
   a mask having opaque portions positioned between said focusing and defocusing means.
4. Apparatus for working a workpiece with an intense beam of photons comprising:
   a laser element having an optical light generating axis;
   first reflecting means positioned across the optical axis and adjacent a first end of said laser element for passing light energy from one side to the opposite side to said laser element and reflecting light energy incident on said opposite side from said laser element;

second reflecting means spatially positioned from the second end of said laser element, said second reflecting means being less than 100% reflective;

means positioned between the laser element and said second reflecting means for modulating the output of said laser element by inhibiting optical feedback thereto;

a source of pumping light positioned adjacent said laser element;

a source of focused light displaced along said optical axis and positioned on the one side of said first reflecting means;

said source of focusing light aligned along said optical axis to illuminate the workpiece through said first reflecting means and coaxially through said laser element and through said modulating means;

means for observing the impingement of light from said source of focusing light upon the workpiece after transmission from the optical cavity;

means for inhibiting and disabling said pumping means and coherent light lasing action observation of the workpiece;

frame means for supporting said laser element, said first and second reflecting means, said modulating means, said source of focused light and observing means, and being movably mounted relative to said workpiece for varying the impingement point of the beam on the workpiece.

5. The apparatus of claim 4 and further comprising:

means for defocusing the light emanating from said optical cavity;

means for refocusing the light defocused by said defocusing means; and a mask having opaque portions positionable between said focusing and defocusing means.

References Cited

UNITED STATES PATENTS

| | | | |
|---|---|---|---|
| 2,987,610 | 6/1961 | Steigerwald | 219—121 |
| 3,096,767 | 7/1963 | Gresser et al. | 331—94.5 |
| 3,118,050 | 1/1964 | Hetherington | 219—69 |
| 3,259,730 | 7/1966 | Wehde et al. | 219—121 |
| 3,265,855 | 8/1966 | Norton | 331—94.5 |
| 3,297,876 | 1/1967 | De Maria | 330—4.3 |
| 3,291,959 | 12/1966 | Schleich et al. | 219—121 |

RICHARD M. WOOD, *Primary Examiner.*

W. D. BROOKS, *Assistant Examiner.*